United States Patent [19]

Sterki et al.

[11] 4,285,133
[45] Aug. 25, 1981

[54] TOOTH FLANK TESTING APPARATUS AND METHOD OF TESTING TOOTH FLANKS OF GEARS

[75] Inventors: Armin Sterki, Uetikon; Gerd R. Sommer, Dietikon, both of Switzerland

[73] Assignee: Maag Gear-Wheel & Machine Co. Ltd., Zürich, Switzerland

[21] Appl. No.: 172,291

[22] Filed: Jul. 25, 1980

[30] Foreign Application Priority Data

Aug. 13, 1979 [CH] Switzerland .................. 7417/79

[51] Int. Cl.³ ................ G01B 5/20; G01B 7/28
[52] U.S. Cl. .................... 33/179.5 R; 33/179.5 D; 33/1 M
[58] Field of Search ............ 33/179.5 R, 179.5 D, 33/291, 1 M

[56] References Cited

U.S. PATENT DOCUMENTS

| | | | |
|---|---|---|---|
| 3,099,883 | 8/1963 | Bergemann et al. | 33/179.5 R |
| 3,741,659 | 6/1973 | Jones, Jr. | 33/179.5 D |
| 3,772,798 | 11/1973 | Kijima | 33/291 |
| 3,849,892 | 11/1974 | Fabish et al. | 33/179.5 D |
| 4,035,084 | 7/1977 | Ramsay | 33/291 |

FOREIGN PATENT DOCUMENTS

| | | | |
|---|---|---|---|
| 2364916 | 8/1975 | Fed. Rep. of Germany | 33/179.5 |
| 2654839 | 8/1977 | Fed. Rep. of Germany | |
| 1457572 | 11/1966 | France | 33/179.5 R |

*Primary Examiner*—Willis Little
*Attorney, Agent, or Firm*—Werner W. Kleeman

[57] ABSTRACT

A gear tooth flank testing apparatus and method wherein there is provided a housing erectable upon a bed or the like of a gear cutting machine. A measuring feeler is moveably arranged at the housing by means of two cross-wire arranged carriages having associated drive and displacement path measuring devices. The measuring feeler is moveable along two coordinated axes intersecting the axis of the workpiece to be tested. A control and evaluation circuit moves the measuring feeler along a tooth flank of the workpiece and compares the actual settings of the measuring feeler with predetermined reference settings. In particular, at the housing there is arranged a feeler bolt which can be pressed in spaced relationship from the measuring feeler against two neighboring tooth flanks of the workpiece. The feeler bolt is guided to be freely moveable by means of two additional cross-wise arranged carriages parallel to both coordinate axes, and each such carriage likewise has operatively associated therewith a displacement path measuring device which is connected with the control and evaluation circuit.

4 Claims, 12 Drawing Figures

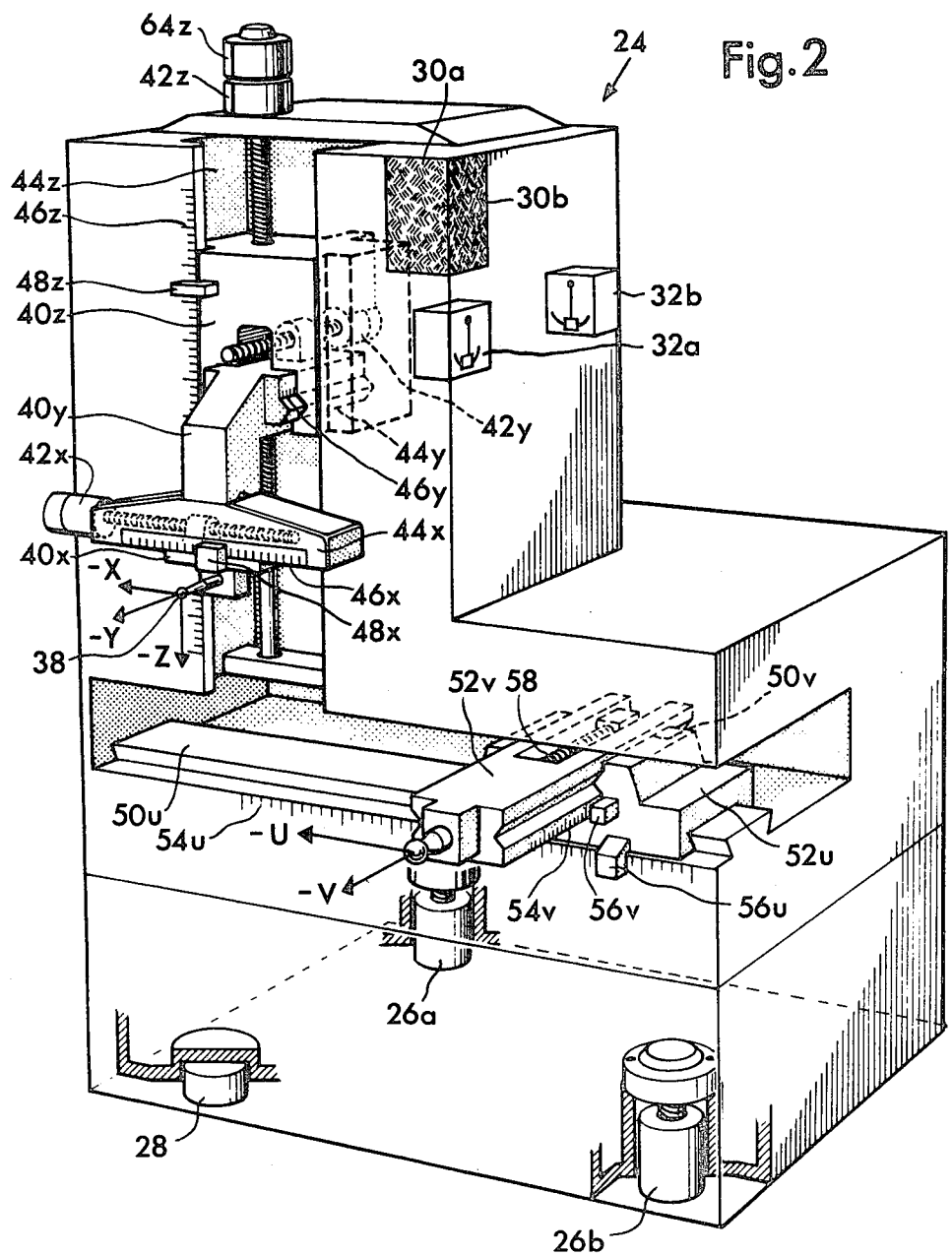

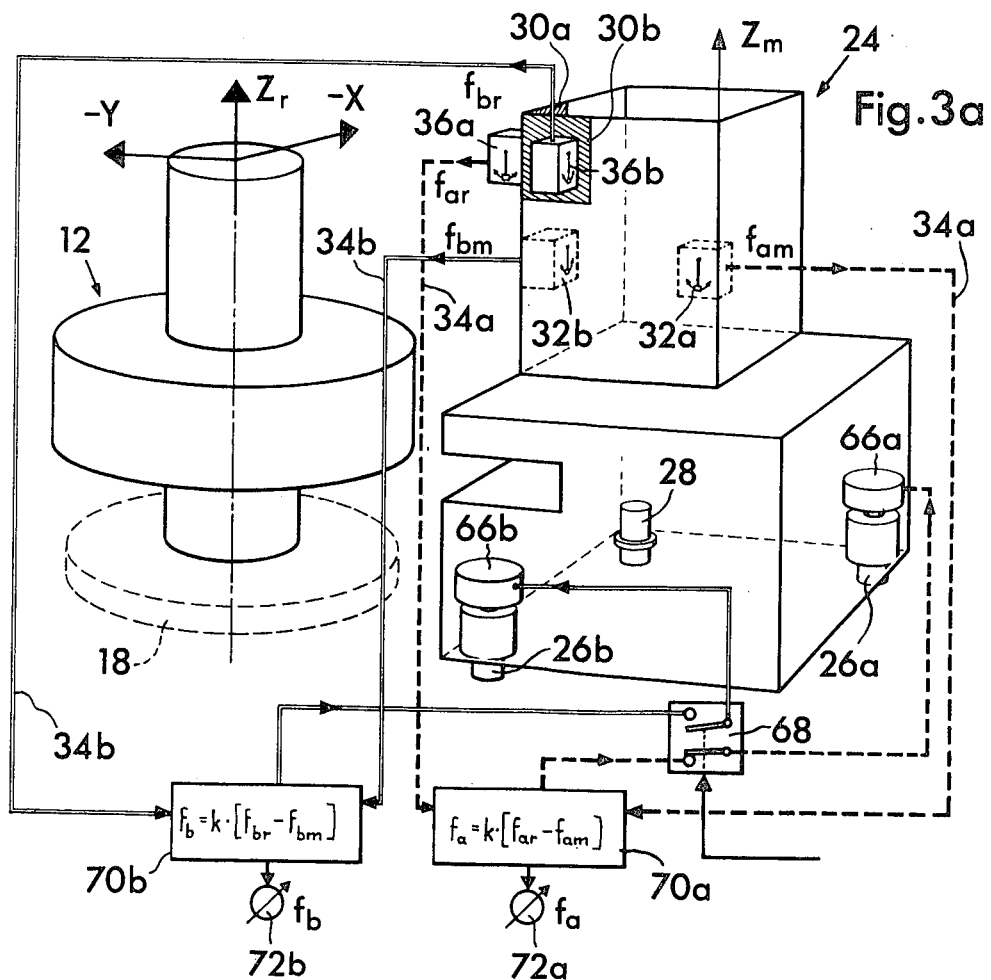

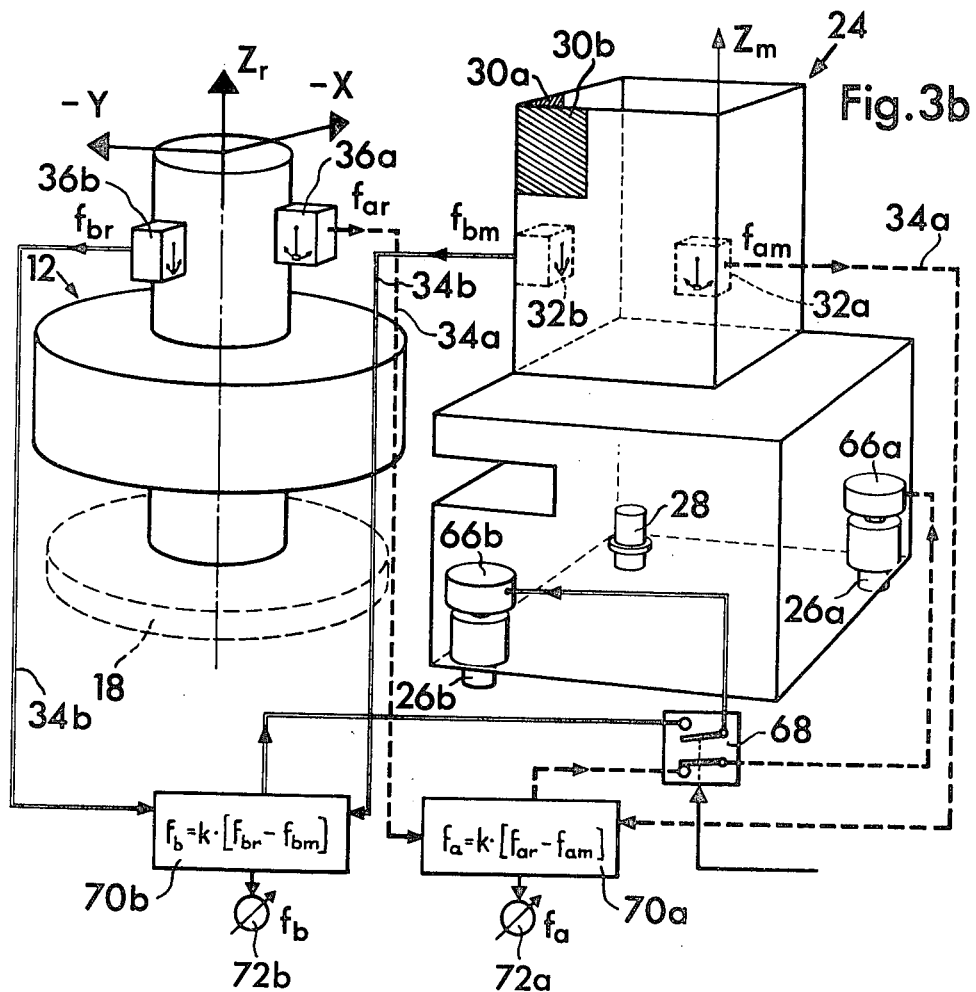

TOOTH FLANK TESTING APPARATUS AND METHOD OF TESTING TOOTH FLANKS OF GEARS

CROSS-REFERENCE TO RELATED CASE

This application is related to our commonly assigned United States application Ser. No. 06/111,769, filed Jan. 14, 1980 and entitled "GEAR TESTING MACHINE".

BACKGROUND OF THE INVENTION

The present invention relates to a new and improved construction of gear tooth flank testing apparatus and a method for testing tooth flanks of gears.

Generally speaking, the gear tooth flank testing apparatus of the present invention is of the type comprising a housing which can be erected upon a bed or the like of a gear cutting machine. Moveably arranged upon the housing is a measuring feeler by means of two cross-wire arranged carriages having associated drive and displacement path measuring devices. The measuring feeler can be moved along two coordinate axes which intersect the axis of the workpieces or gear to be tested. Additionally, there is provided a control and evaluation circuit for moving the measuring feeler along a tooth flank of the gear or workpiece and for the comparison of the actual positions of the measuring feeler with predetermined reference positions.

Under the expression "gear cutting machine" as used in conjunction with the present invention, there is to be understood any random machine suitable for processing gear-shaped workpieces or toothed segment-shaped workpieces, such as gear cutter or gear grinding machines, wherein there is afforded for such machines the typical possibility of rotating the workpiece slowly about its own axis in relation to a bed, a stand or the like provided at the machine.

The feature that the housing of the gear tooth flank testing apparatus can be erected upon the bed or the like of the gear cutting machine means that, on the one hand, not all components of the tooth flank testing machine must be absolutely erected upon the gear cutting machine, rather that the control and evaluation circuit can be mounted separately and at a random spacing from the gear cutting machine, and that on the other hand, the housing need not be erected continuously at one and the same gear cutting machine. Quite to the contrary, such housing can be selectively and alternately erected in each case at one of a number of gear cutting machines, in order to carry out gear tooth measurements at a test piece during such time as the same is chucked at the related gear cutting machine, so that following the measuring operation it can be further machined without having to again be centered.

A feature that the measuring feeler can be moved by means of two cross-wise arranged slides or carriages along two coordinates intersecting the axis of the test piece or gear, is not intended to preclude in any way that the measuring feeler can be moved by means of a third carriage or slide also along a third coordinate axis, in other words, throughout a spatial rectangular coordinate system. However, such additional possibility of movement generally only then is required when the gear tooth flank testing machine is not only used for testing a gear tooth flank profile, but also for testing the pitch of the tooth helix or angle of the tooth.

Under the term "actual positions" of the measuring feeler, there should be understood the actual positions which the measuring feeler assumes during the measurement, while under the term "reference positions", there should be understood, on the other hand, those positions which the measuring feeler would assume if the measured tooth flank were free of any faults.

Each testing operation consists of two procedures, namely the determination of an actual state and the comparison of the actual state with a reference state. A tooth flank testing apparatus therefore not only has to determine, for instance, the actual profile of a tooth flank, but rather must compare such with a reference profile. It is for this reason that it is not sufficient for testing gear flanks to use the heretofore known methods and apparatuses, such as for instance disclosed in German Patent Publication No. 2,654,839, which are intended to measure the contour of a workpiece which is totally unknown as concerns its dimensions, in two or more dimensions. The invention therefore starts with aa gear tooth flank testing machine of the previously mentioned species, in other words, a machine having a control and evaluation circuit for moving the measuring feeler along a tooth flank of the test piece or gear as well as for comparing the actual positions of the measuring feeler with predetermined reference positions. According to a known tooth flank testing machine of this species, as disclosed for instance in German Patent Publication No. 2,364,916 and the corresponding U.S. Pat. No. 4,166,323, which is not only suitable for testing tooth flank profiles, rather also for testing the tooth helix pitch angles, and therefore possesses a measuring feeler moveable along the three axes of a spatial coordinate system, the control and evaluation circuit is designed such that it moves the measuring feeler, during standstill of the test piece along a predetermined path corresponding to the reference profile or the reference pitch helix of the test piece, and records the thus arising deviations of the measuring feeler as faults. To control the measuring feeler according to this technique it is necessary that the entire path data of the measuring feeler not only previously be stored as to the coordinates of such path, but also that such path data be transposed, based upon the first measurement result, in a manner such that it corresponds to the previously not predeterminable spatial arrangement of the housing of the tooth flank testing machine in relation to the gear being tested or workpiece. For this purpose, there is required a considerable expenditure in computer capacity and programming.

There is also already known to the art a tooth flank testing apparatus as disclosed in U.S. Pat. No. 3,741,659, wherein the gear to be tested or workpiece is rotated by its own drive about its axis and the measuring feeler is not moved along a predetermined path, rather is guided, by means of servo motors, along the tooth flank which is scanned by the measuring feeler. The rotation of the tested gear constitutes the control magnitude for the entire course of the movement. The correlation of the actual data to the reference data, needed for testing the tooth flanks, presupposes, that, on the one hand, between the axis of the tested gear and the guides for the cross-wise arranged carriages or slides, carrying the measuring feeler, there exists a predetermined spatial correlation, and on the other hand, there is operatively associated with the rotary drive for the tested gear a measuring device. This measuring device is capable of extremely accurately indicating at any point in time, the angular rotational position of the tested gear. In the case of conventional gear cutting machines there is however neither present such measuring device nor does there exist a predetermined correlation between the axis of rotation of the tested gear and a housing of a gear tooth flank testing machine which can be erected only temporarily at the gear cutting machine.

SUMMARY OF THE INVENTION

Therefore, with the foregoing in mind it is a primary object of the present invention to provide a new and improved construction of tooth flank testing machine and method of testing gear tooth flanks in a manner not associated with the afore-mentioned drawbacks and limitations of the prior art proposals.

Another and more specific objection of the present invention aims at devising a new and improved construction of gear tooth flank testing machine of the previously mentioned type, which is capable, with less expenditure in computer capacity and programming than in comparison to the described prior art equipment, of determining the spatial correlation of its housing, which only has been erected for carrying out one test or series of tests at the gear cutting machine, in relation to the gear to be tested which has been chucked at the gear cutting machine and continuously accommodating such determination to the testing operation.

Now in order to implement these and still further objects of the invention, which will become more readily apparent as the description proceeds, the invention contemplates that at the housing there is freely moveably guided parallel to both coordinate axes a feeler bolt which can be pressed in spaced relationship from the measuring feeler at two neighboring tooth flanks of the gear to be tested. The feeler bolt is freely moveably guided at two additional crosswise arranged carriages or slides parallel to both coordinate axes, and each of these slides or carriages likewise has operatively associated therewith a displacement path measuring device which is connected with the control and evaluation circuit.

The feeler bolt arranged in the described manner, the position of which in relation to the measuring feeler can be determined at any point in time by the tooth flank testing machine itself, renders possible, on the one hand, at the start of each measurement or series of measurements, carrying out an orientation operation by means of which there can be determined the spatial position of the housing of the inventive tooth flank testing apparatus in relation to the axis of the tested gear, and, on the other hand, enables during the actual testing operation a continuous determination of the angular rotation of the tested gear in relation to the housing of the tooth flank testing apparatus. The drive for the relative movement of the tested gear in relation to the housing of the tooth flank testing apparatus therefore need not be provided with its own measuring device, nor need there be satisfied special requirements as to the play and constantness of the drive; independent of each inaccuracy of this drive the inventive feeler bolt determines in each instance the actual angular position of the tested gear.

The expenditure in computer capacity and programming can be maintained exceedingly small with the inventive gear tooth flank testing apparatus, if at the start of the described orientation operation there is accomplished an alignment operation. By means of this alignment operation there is insured that the plane of both coordinate axes extend perpendicular to the axis of the tested gear, in other words constitute a horizontal plane if the axis of the tested gear is vertically arranged. This alignment operation can be particularly easily carried out if, according to a further facet of the invention, there are arranged at the housing of the inventive gear tooth flank testing apparatus two planar or flat reference surfaces which are perpendicular to one another and to the movement plane of the feeler bolt, and if furthermore there are mounted at the housing two inclination measuring devices for measuring the inclination of the housing in the plane of a respective one of both reference surfaces. These inclination measuring devices are connected by means of a respective compensation circuit with a respective further inclination measuring device which selectively can be secured at the related reference surface and at the tested gear, and if finally the housing has two adjustable base portions or feet which in conjunction with a further base portion or foot forms the corners of a triangle.

Hence, the testing of a gear tooth flank or a series of gear tooth flanks, with the inventive gear tooth flank testing machine, preferably is accomplished in the following manner: The housing is adjusted in relation to the tested gear such that the movement plane of the feeler bolt, in other words, the plane of both mentioned coordinate axes, extend at right angles to the axis of the tested gear and the feeler bolt bears at two mutually neighboring tooth flanks of the tested gear. The tested gear is rotated about its axis, and the thus caused movements of the feeler bolt are measured parallel to both mentioned coordinate axes. From such measurements there is determined the spacing of the feeler bolt from the axis of the tested gear as well as the position of such axis, and then the tested gear is further or again rotated about its own axis, whereas in spaced relationship from the feeler bolt there is moved the measuring feeler for measuring the tooth flank course (profile or pitch helix) along one of the tooth flanks, at the same time there is again measured the movements of the feeler bolt caused by the rotation of the tested gear parallel to both of the coordinate axes and the thus resultant rotational angle or angular position of the tested gear, upon which there is predicated the determination of the reference course of the tooth flank is compared with the actual course which has been determined by the measuring feeler.

BRIEF DESCRIPTION OF THE DRAWINGS

The invention will be better understood and objects other than those set forth above, will become apparent when consideration is given to the following detailed description thereof. Such description makes reference to the annexed drawings wherein exemplary embodiments of the inventive tooth flank testing apparatus as well as a respective embodiment of a tooth profile and a tooth pitch helix measurement which is accomplished with such equiment is described in greater detail hereinafter in conjunction with the schematic illustrations, and specifically wherein:

FIG. 2 illustrates the mechanical portion of the tooth flank testing apparatus or machine in enlarged perspective view looking from another direction;

FIG. 3a illustrates a first step during alignment of the mechanical part of the tooth flank testing apparatus in relation to the tested gear;

FIG. 3b illustrates a second step during the alignment operation;

DETAILED DESCRIPTION OF THE PREFERRED EMBODIMENTS

Figure 1:
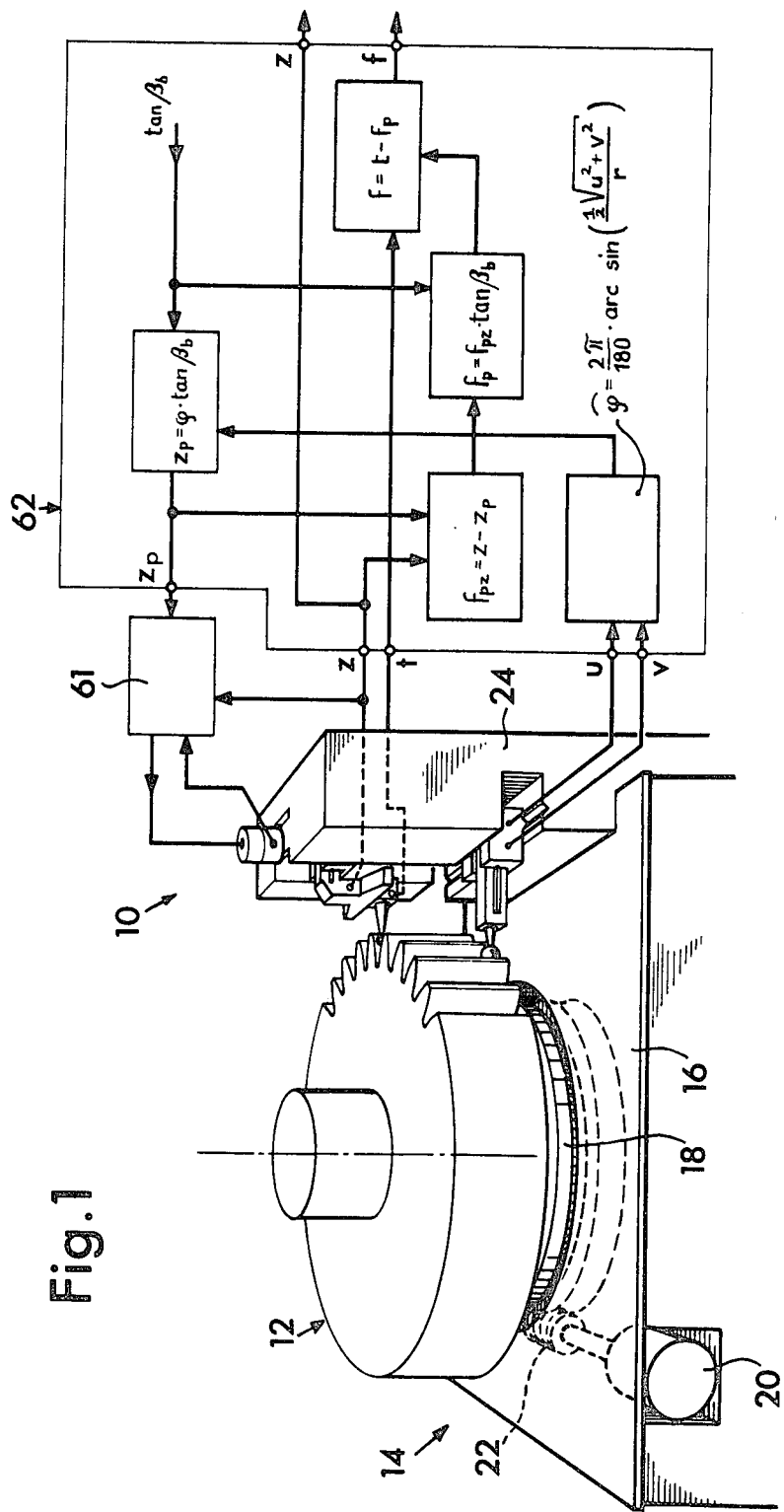
FIG. 1 is a perspective view of a gear to be tested arranged at an only partially shown gear cutting machine as well as the mechanical part of a gear tooth flank testing apparatus whose control and evaluation circuit is shown in the form of a block circuit diagram.

Describing now the drawings, in FIG. 1 there is illustrated a gear tooth flank testing apparatus or machine 10 during such time as it tests a gear or workpiece 12, here illustrated as a straight toothed spur gear, arranged upon a gear cutting machine 14. Two mutually perpendicular axes in an end plane of the tested gear 12 will be referred to hereinafter as the X-axis and the Y-axis, whereas the axis of rotation of the tested gear 12, extending at right angles thereto, in other words, perpendicular to both of these axes, will be designated herein as the Z-axis.

As to the gear cutting machine 14, which may be assumed to be a gear grinding machine of conventional construction, there have only been illustrated in FIG. 1 the parts or components thereof which are relevant in terms of their correlation to the gear tooth flank testing apparatus 10. In particular, there will be seen a stationary bed 16 upon which there is rotatably mounted a circular table 18 for rotation about the Z-axis, as well as a drive motor 20 which is capable of driving the circular table 18 at suitable moderate velocities by means of a worm gearing drive 22, the driving speed being appropriate for testing the tooth flanks of the gear. The tooth flank testing apparatus or machine 10 will be seen to contain a housing 24 which is erected upon the bed 16 for the duration of carrying out one test or a series of tests at the tested gear 12. This tested gear or workpiece 12 is and therefore remains chucked and centered at the circular table 18 of the gear cutting machine 14.

With the indicated gear cutting machine 14 such may be assumed to be of the type comprising a not further illustrated stationary stand, at which there is guided to be moveable up-and-down a carriage or slide containing one or a number of processing tools, for instance grinding wheels, the carriage imparting to the processing or working tools to-and-fro movements in the tooth lengthwise direction of the tested gear 12. However, nothing need change in the following described construction and mode of operation of the tooth flank testing apparatus 10 if the tested gear 12 were to be checked at a gear cutting machine where the rotational movements about the Z-axis, needed for the fabrication of the gear teeth, are not carried out by the tested gear or workpiece, rather by a rotatably mounted stand. In this case, the housing 24 of the tooth flank testing apparatus 10 must be erected upon the stand, so that—in principle just as for the arrangement of FIG. 1—there are possible between the tested gear 12 and the housing 24 relative rotations about the Z-axis.

The housing 24 of the showing of FIG. 2 has two elevationally adjustable feet or base portions 26a and 26b arranged in spaced relationship from one another and from a fixed foot or base portion 28 at the corners of a right angle triangle, whose right angle is formed at the fixed foot 28. At its upper region the housing 24 possesses two flat or planar reference surfaces 30a and 30b which enclose a right angle with respect to one another. Within the housing 24 there are mounted two fixed inclination measuring devices 32a and 32b, of which the first inclination measuring device 32a determines deviations of the first reference surface 30a from the vertical, whereas the second inclination measuring device 32b determines deviations of the second reference surface 30b from the vertical.

Both of the fixed inclination measuring devices 32a and 32b as shown in FIGS. 3a and 3b, are connected by a respective line or conductor 34a and 34b with a respective inclination measuring device 36a and 36b moveably arranged externally of the housing 24.

Displaceably guided at the housing 24 is a measuring feeler 38 along the three coordinate axes X, Y and Z. The adjustability along the X-axis is realized in that the measuring feeler 38 is arranged upon a X-carriage or slide 40x which is displaceable along a X-guide 44x by means of a X-servo drive 42x. At the X-guide or guide means 44x there is provided a X-scale 46x at which a X-reading head 48x, attached to the X-slide or carriage 40x, is capable of reading at any point in time the position of such carriage or slide 40x in relation to the X-guide 44x.

The X-guide 44x is formed at a Y-slide or carriage 40y which, in turn, is shiftable by means of a Y-servo drive 42y along a Y-guide or guide means 44y. The guides or guide means 44x and 44y extend at right angles to one another and define a horizontal plane in the normal position of the housing 24. Arranged at the Y-guide 44y is a Y-scale 46y, at which there can be read-off by means of a not particularly illustrated Y-reading head, for instance like the reading head 48x discussed above, the position of the Y-carriage or slide 40y in relation to a Z-carriage or slide 40z.

The Z-carriage 40z is displaceable by means of a Z-servo drive 42z along a Z-guide or guide means 44z, extending at right angles to the X-Y plane and formed directly at the housing 24. The Z-carriage 40z is provided with a Z-scale 46z with which coacts a Z-reading head 48z or equivalent structure attached to the Z-carriage or slide 40z.

Furthermore, there is formed at the housing 24 a U-shaped guide 50u which extends parallel to the X-guide or guide means 44x and carries a U-shaped carriage or slide 52u, the position of which can be read-off at a U-scale 54z by means of a U-reading head 56u which is secured at the U-carriage 52u.

At the U-carriage 52u there is formed a V-guide 50v which extends parallel to the Y-guide 44y, and in this V-guide 50v there is displaceably guided a V-carriage or slide 52v. The position of the V-carriage 52v can be read-off at a V-scale 54v formed at the V-carriage 52v, by means of a V-reading head 56v which is secured at the U-carriage 52u. The V-carriage 52v is biased, in relation to the U-carriage 52u, by a spring 58 in the direction which has been designated in FIG. 2 by reference character —V. At the V-carriage 52v there is exchangeably attached a feeler bolt 60 or equivalent feeler or sensor element. The attachment of the feeler bolt 60 at the V-carriage 52v is rigid, so that the feeler bolt 60 converts all externally imposed movements thereat into corresponding movements of the carriages 52u and/or 52v. The feeler bolt 60 is also not deflectable in relation to the carriage 52v which directly supports the same, thus is not itself constructed as a measuring bolt, in contrast to the measuring feeler 38 which can be deflected in the direction of the X-axis, in relation to the X-carriage 40z, and during each deflection delivers a signal.

According to the showing of FIG. 1 the measuring feeler 38 as well as each of the servo drives 42x, 42y and 42z are connected with a control and evaluation circuit 62, which can be arranged at a certain distance from the gear cutting machine 14 in a special housing. Between each of the servo drives 42x, 42y and 42z and the control and evaluation circuit 62 there can be provided a position regulator arranged directly at or in the housing 24. In the arrangement of FIG. 1 there has only been indicated one such position regulator 61 for the Z-servo drive 42z. This position regulator 61, during checking of the gear teeth pitch helix of the tested gear 12 is assigned the task of regulating the movement of the Z-carriage 40z such that the measuring feeler 38 is deflected from the tooth flank, along which it moves, always through a given amount.

According to the showing of FIGS. 3a and 3b each of the adjustable feet or base portions 26a and 26b has operatively associated therewith a servo motor 66a and 66b, respectively, which can be connected by means of a switch 68 or equivalent structure with a compensation or balancing circuit 70a and 70b. The compensation circuit 70a is located in the line or conductor 34a between the inclination measuring devices 32a and 36a. In corresponding manner the other compensation circuit 70b is arranged in the line or conductor 34b between the inclination measuring devices 32b and 36b. Each of the compensation circuits 70a and 70b has operatively associated therewith a potentiometer 72a and 72b, respectively.

The X, Y, Z-carriage arrangements 40x, 40y and 40z need not, as illustrated in FIGS. 1 and 2, possess, as viewed from the measuring feeler 38, an alphabetic sequence of carriages or slides. Each other random sequence can fulfill the same purpose. For instance, the measuring feeler or sensor 38, according to the showing of FIGS. 6a to 8b, can be secured at the Y-carriage or slide 40y, which is guided displaceably along the Y-axis at the Z-carriage or slide 40z, which, in turn, is guided displaceably along the Z-axis at the X-carriage 40x, and this X-carriage is directly guided at the housing 24 to be displaceable along the X-axis. Also the U, V-slide arrangements 52u, 52v can have a different sequence, but generally the arrangement illustrated in FIG. 2 and coinciding with FIGS. 4 to 7b is preferred.

The feeler bolt 60 has an exchangeable spherical-shaped head 74, the diameter of which is selected in accordance with the tooth space width of the tested gear 12 from case to case in such a manner that the head 74, as best seen by referring to FIGS. 4 to 7b, can contact two neighboring tooth flanks 76l and 76r of the tested gear or workpiece 12.

The tooth flank testing apparatus 10 described heretofore is prepared and employed for testing the tooth flank profile and/or the tooth pitch helix of the tested gear 12 in the following manner:

If the housing 24 of the tooth flank testing apparatus 10, as shown in FIG. 1, is erected upon the bed 16 of the gear cutting machine 14, then it is not possible to simply assume that the lengthwise direction of the Z-guide 44z will extend exactly parallel to the Z-axis, in other words the axis of rotation of the tested gear 12. Therefore, the housing 24 initially must be appropriately aligned. As a preparatory step for the alignment each of the movable inclination measuring devices 36a and 36b, according to the showing of FIG. 3a, are attached to the related reference surface 30a and 30b, respectively, most simply through the force of a respective permanent magnet which is incorporated into such inclination measuring devices 36a and 36b. In this way there is insured that each of the moveable inclination measuring devices 36a and 36b assumes, with respect to the housing 24, a corresponding position like the related fixed inclination measuring device 32a and 32b, respectively. The signals $f_{am}$ and $f_{ar}$, delivered by both of the inclination measuring devices 32a and 36a are balanced if necessary by adjusting the potentiometer 72a. In corresponding manner the signals $f_{bm}$ and $f_{br}$, delivered by the inclination measuring devices 30b and 36b, if necessary are balanced by adjusting the potentiometer 72b. Then the moveable inclination measuring devices 36a and 36b, as best seen by referring to FIG. 3b, are applied in an offset relationship of 90° with respect to one another to the tested gear 12. Now if once again there arise deviations between the signals $f_{am}$ and $f_{ar}$ or between the signals $f_{bm}$ and $f_{br}$, then this is an indication that the housing 24 is not aligned with respect to the tested gear 12. Therefore, it is necessary to positionally adjust the moveable foot 26a and/or the moveable foot 26b, until the aforementioned signals are again balanced. The adjustment of the moveable feet 26a and 26b is automatically performed by the compensation or balancing circuit 70a and 70b by means of the servo motors 66a and 66b, respectively.

Now it is assumed that the housing 24 assumes a position where the Z-guide 44z extends parallel to the Z-axis and the spherical-shaped head 74 of the feeler bolt 60 bears under the pre-bias of the spring 58 at two neighboring tooth flanks 76l and 76r, and thus possesses a certain spacing from the Y-axis. The starting position of the feeler or sensor 60 has been shown in full lines in FIG. 4. Now the tested or test gear 12 is rotated in the direction of the arrow 78 of FIG. 4 until the feeler 60 assumes the terminal position shown in chain-dot lines in FIG. 4. The selection of the starting and terminal position is random within wide limits, but the one position should be located at the one side and the other position at the other side of the Y-axis. During the rotation of the test gear 12 in the direction of the arrow 78 the spherical-shaped head 74 of the feeler bolt 60 migrates through its culmination position K indicated with a broken line circle in FIG. 4, in which the center of the head 74 is located at the Y-axis. Upon approaching the culmination position K the feeler bolt 60 displaces the V-carriage 52v in the direction +V, whereas it displaces the U-carriage 52u in the direction —U. The culmination position K is that position where there has altered the direction of the movement of the V-carriage 52v from +V to —V. This sign change is detected by the control and evaulation circuit 62 with great accuracy on the basis of the signals delivered by the V-reading head 56b. Consequently, the position of the Y-axis becomes a known magnitude for the tooth flank testing apparatus 10.

Figure 4:
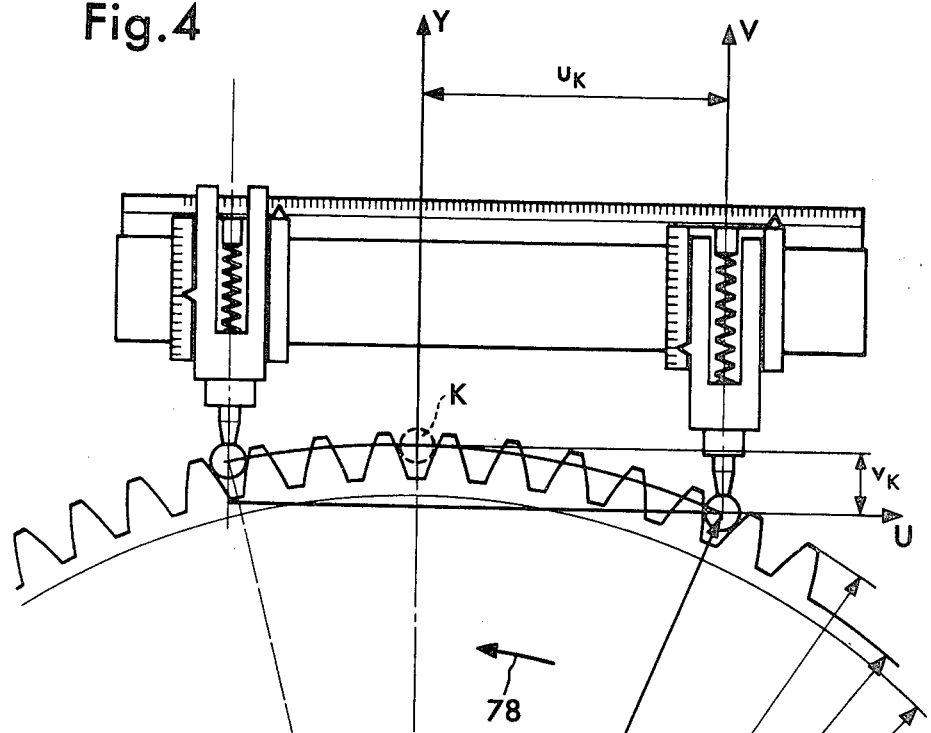
FIG. 4 illustrates the orientation operation, by means of which there can be determined the position of the mechanical part of the tooth flank testing apparatus in relation to the tested gear.

During the movement from the starting position into the culmination position K the head 74, as shown in FIG. 4, moves through the distance $u_k$ and $v_k$. As to these distances or paths the following relationship is valid:

$$u_k^2 + (r - v_k)^2 = r^2.$$

By performing a simple transformation there results:

$$r = \frac{u_k^2 + v_k^2}{2v_k}.$$

In the above equations r constitutes the radius measured from the origin of the X, Y, Z-coordinate system, at which there is located the center of the spherical-shaped head 74. This radius r therefore, following a single movement of the feeler bolt 60 out of a random starting position into a random end or terminal position located to the other side of the culmination position K, can be twice computed from a respective measuring value pair $u_k$, $v_k$. Since, on the other hand, the diameter of the head 74 in the tooth gap width of the test or tested gear 12 is known, the tooth flank testing apparatus 10 is capable of computating from the determined radius r the position of the origin of the X, Y, Z-coordinate system in a most simply and extremely accurate manner. Thus, the orientation of the tooth flank testing apparatus 10 in relation to the tested gear 12 is known.

Figure 5:
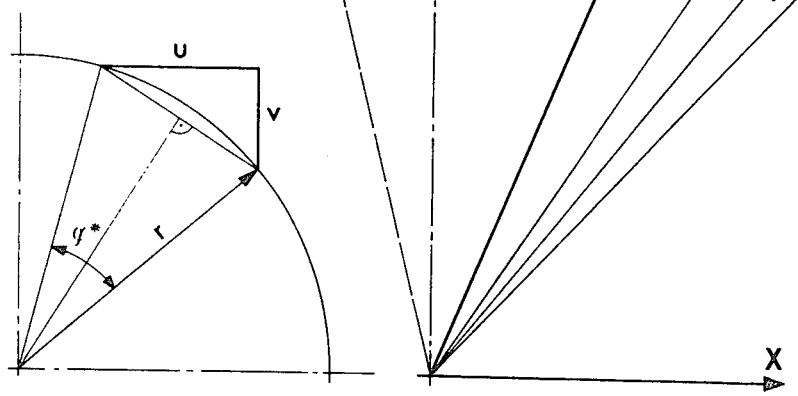
FIG. 5 illustrates the geometrical principles which are employed during the orientation operation.
Figure 6A:
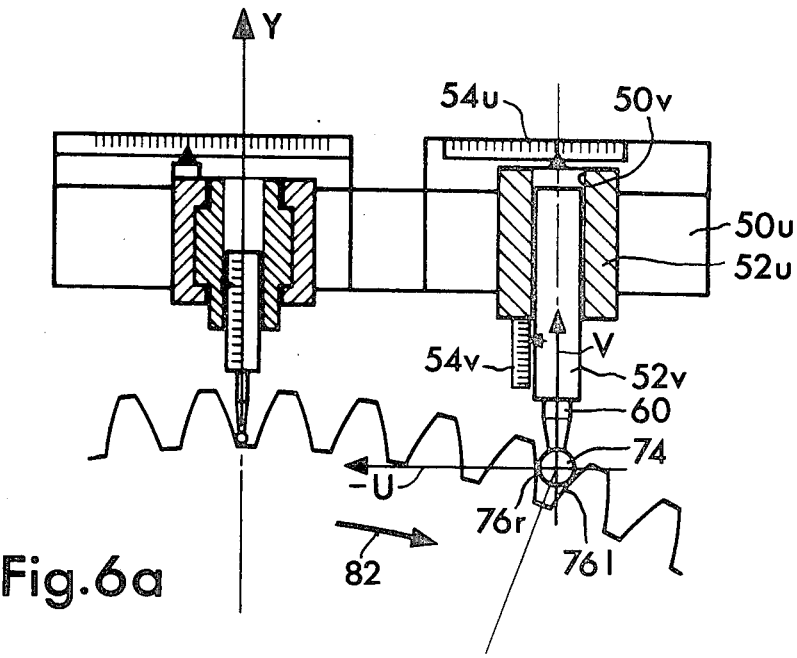
FIG. 6a illustrates the starting position of a tooth profile test.
Figure 6B:
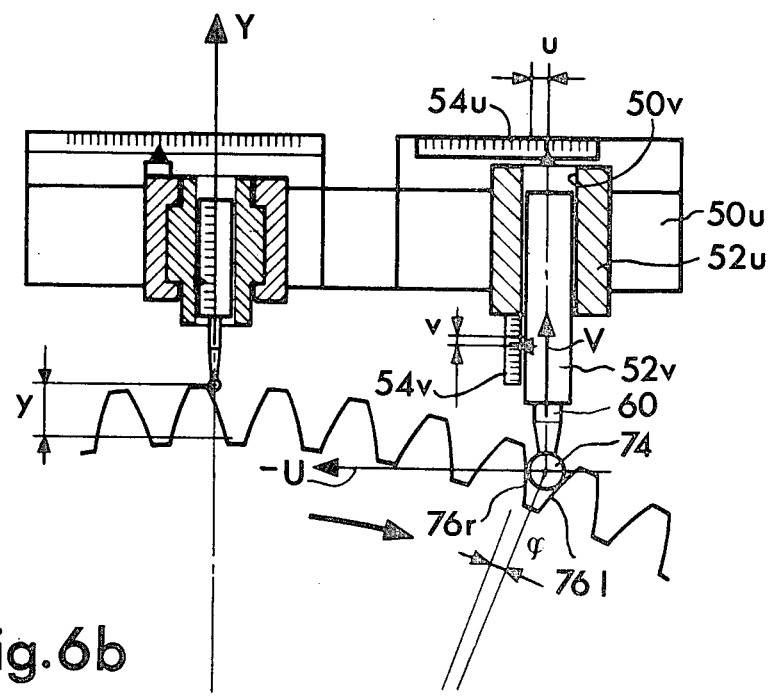
FIG. 6b illustrates the related end position.
Figure 7A:
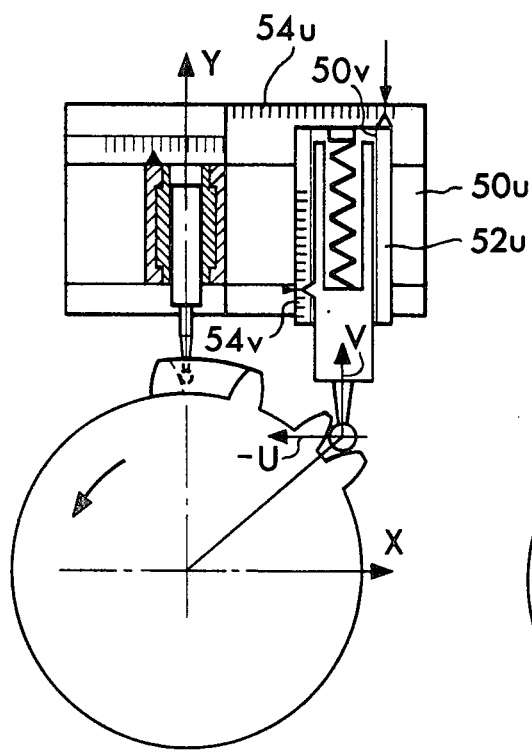
FIG. 7a illustrates the starting position of a tooth pitch helix test in an end view of the tested gear.
Figure 7B:
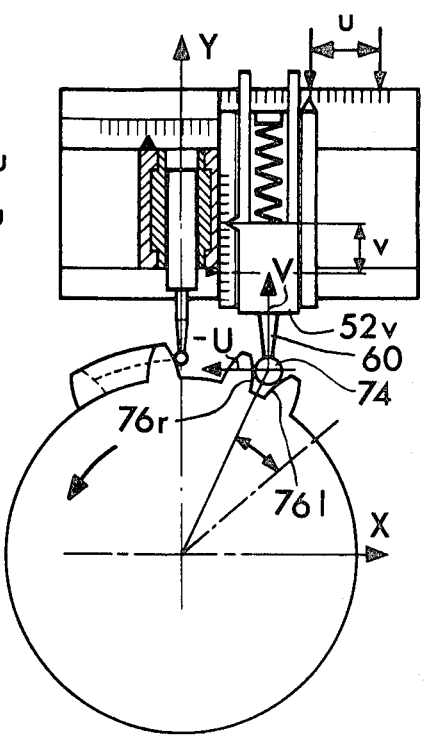
FIG. 7b illustrates the related end position.
Figure 8A:
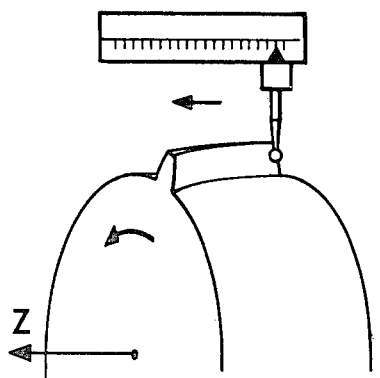
FIG. 8a illustrates the starting position according to the showing of FIG. 7a, however in a perspective view of the tested gear.
Figure 8B:
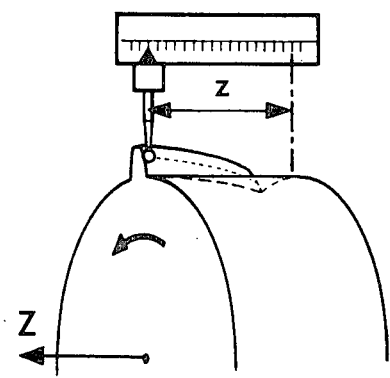
FIG. 8b illustrates the end or terminal position corresponding to the showing of FIG. 7b, however likewise in perspective view of the tested gear.

Now if there should be accomplished a tooth profile checking or testing operation, then the measuring feeler 38, for instance according to the showing of FIG. 6a, is brought into a starting position at the tooth root or base of a tooth flank 80, whereas the feeler bolt 60 bears by means of its spherical-shaped head 74 in spaced relationship therefrom again at two mutually neighboring tooth flanks 76l and 76r. Now if the tested gear 12 is rotated in the direction of the arrow 82 through the angle $\phi$, then the measuring feeler 38 migrates along the tooth flank 80 up to the tooth tip, whereas the feeler bolt 60, according to the showing of FIG. 6b, moves through the paths u and v. The reading heads 56u and 56v deliver signals, corresponding to such paths or distances u and v to the control and evaluation circuit 62 and such computes therefrom the angle $\phi$ according to the equation $$\phi = 2 \cdot \arcsin \cdot \frac{\sqrt{u^2 + v^2}}{2r}$$

which can be readily derived from FIG. 5.

Therefore, by means of the feeler bolt 60 together with the related scales 54u and 54v as well as the reading heads 56u and 56v it is possible to determine each angle of rotation $\phi$ which arises during checking of a tooth flank, without there being required at the gear cutting machine 14 itself an angle measuring device. What is measured is the angle of rotation through which in fact there has moved the tested gear 12, so that the measurement result is not falsified by inaccuracies of the rotary drive operatively correlated to the gear cutting machine.

The same holds true if according to FIGS. 7a and 7b and 8a and 8b there is to be tested the tooth pitch helix of the tested gear 12, i.e. the helix angle.

While there are shown and described present preferred embodiments of the invention, it is to be distinctly understood that the invention is not limited thereto, but may be otherwise variously embodied and practiced within the scope of the following claims. Accordingly,

What we claim is:

1. A gear tooth flank testing apparatus comprising:
   a gear cutting machine containing a bed;
   a housing erectable upon said bed;
   two cross-wise arranged carriages;
   drive means provided for said two cross-wise arranged carriages;
   displacement path measuring means provided for said two cross-wise arranged carriages;
   a feeler mounted at said housing by means of said two cross-wise arranged carriages and moveable along two coordinate axes intersecting the lengthwise axis of the gear to be tested;
   control and evaluation circuit means for guiding said measuring feeler along a tooth flank of the gear to be tested and for comparison of an actual position of the measuring feeler with a predetermined reference position;
   a feeler element arranged at said housing in spaced relationship from said measuring feeler;
   said feeler element being capable of being placed into contact with two mutually neighboring tooth flanks of the gear to be tested;
   two additional cross-wise arranged carriages for freely moveably guiding said feeler element essentially parallel to both of said coordinate axes;
   a displacement path measuring device operatively associated with each of said additional cross-wise arranged carriages; and
   said displacement path measuring device being connected with a control and evaluation circuit.

2. The tooth flank testing apparatus as defined in claim 1, wherein:
   said feeler element comprises a feeler bolt.

3. The tooth flank testing apparatus as defined in claim 1, wherein:
   said housing contains two substantially planar reference surfaces arranged perpendicular with respect to one another and with respect to a plane of movement of said feeler element;
   two inclination measuring devices mounted at said housing;
   said two inclination measuring devices serving to measure inclinations of said housing in the plane of a respective one of both reference surfaces;
   a respective inclination measuring means;
   a respective balancing circuit;
   each of said inclination measuring devices being connected by means of a related respective one of said balancing circuits with a respective one of said inclination measuring means;
   each of said respective inclination measuring means being capable of selective attachment to the related reference surface and the gear to be tested;
   two adjustable feet and a further foot provided for said housing; and
   said two adjustable feet and said further foot defining the corners of a triangle.

4. A method of testing gear flanks of gears with a gear tooth flank testing apparatus which comprises a gear cutting machine containing a bed, a housing erectable upon said bed, two cross-wise arranged carriages, drive means provided for said two cross-wise arranged carriages, displacement path measuring means provided for said two cross-wise arranged carriages, a measuring feeler mounted at said housing by means of said two cross-wise arranged carriages and moveable along two coordinate axes intersecting the lengthwise axis of the gear to be tested, control and evaluation circuit means for guiding said measuring feeler along a tooth flank of the gear to be tested and for comparison of an actual position of the measuring feeler with a predetermined reference position, a feeler element arranged at said housing in spaced relationship from said measuring feeler, said feeler element being capable of being placed into contact with two mutually neighboring tooth flanks of the gear to be tested, two additional cross-wise arranged carriages for freely moveably guiding said feeler element essentially parallel to both of said coordinate axes, a displacement path measuring device operatively associated with each of said additional cross-wise arranged carriages, and said displacement path measuring device being connected with a control and evaluation circuit, comprising the steps of:

adjusting the housing in relation to the gear to be tested such that the movement plane of the feeler element extends essentially at right angles to the axis of the gear to be tested and the feeler element bears against two mutually neighboring tooth flanks of the gear to be tested;

rotating the gear about its axis;

measuring the resultant movements of the feeler element caused by the rotation of the gear in a direction parallel to booth coordinate axes;

deriving from such measurement the distance of the feeler element from the axis of the gear to be tested as well as the position of such gear axis;

then rotating the gear about its gear axis while moving the measuring feeler, which is in spaced relationship from the feeler element, along a tooth flank in order to measure the course of the tooth flank, while simultaneously again measuring the movements of the feeler element caused by the rotation of the gear to be tested parallel to both of said coordinate axes;

utilizing the thus determined angle of rotation of the gear to be tested for the determination of a reference course of the tooth flank; and comparing said reference course with an actual course of the tooth flank as determined by the measuring feeler.

* * * * *